United States Patent
Itoh

(10) Patent No.: US 7,026,667 B2
(45) Date of Patent: Apr. 11, 2006

(54) SEMICONDUCTOR INTEGRATED CIRCUIT DEVICE HAVING CLOCK SIGNAL TRANSMISSION LINE AND WIRING METHOD THEREOF

(75) Inventor: Niichi Itoh, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 251 days.

(21) Appl. No.: 10/226,204

(22) Filed: Aug. 23, 2002

(65) Prior Publication Data

US 2003/0063697 A1    Apr. 3, 2003

(30) Foreign Application Priority Data

Sep. 28, 2001    (JP) .............................. 2001-301012

(51) Int. Cl.
*H01L 27/10* (2006.01)
(52) U.S. Cl. ...................................... 257/208; 257/202
(58) Field of Classification Search ................ 257/228; 713/500, 501, 502, 508
See application file for complete search history.

(56) References Cited

U.S. PATENT DOCUMENTS 6,124,744 A * 9/2000 Oowaki
6,275,446 B1 * 8/2001 Abedifard
6,298,465 B1  10/2001 Klotchkov

FOREIGN PATENT DOCUMENTS

| JP | 9-258842 | 10/1997 |
| JP | 10-56068 | 2/1998 |
| TW | 452906 | 1/2001 |

* cited by examiner

*Primary Examiner*—Minhloan Tran
*Assistant Examiner*—Kevin Quinto
(74) *Attorney, Agent, or Firm*—McDermott Will & Emery LLP

(57) ABSTRACT

A clock signal transmission line in the semiconductor integrated circuit device includes a plurality of straight portions arranged side by side in a predetermined direction and a plurality of bent portions connecting the respective straight portions. At least two of a plurality of signal lines to which a clock signal is transmitted are connected to different straight portions. Consequently, a semiconductor integrated circuit device which can reduce a clock skew when transmitting a clock signal to a plurality of signal lines is provided.

12 Claims, 13 Drawing Sheets

SEMICONDUCTOR INTEGRATED CIRCUIT DEVICE HAVING CLOCK SIGNAL TRANSMISSION LINE AND WIRING METHOD THEREOF

BACKGROUND OF THE INVENTION

1. Field of the Invention

The present invention relates to a semiconductor integrated circuit device and more particularly relates to a semiconductor integrated circuit device having a clock signal transmission line distributing a clock signal to a plurality of signal lines.

The present invention also relates to a wiring layout design method and a wiring layout design apparatus for designing clock signal transmission lines for distributing a clock signal to a plurality of signal lines.

2. Description of the Background Art

FIG. 13 is a block diagram showing the schematic configuration of a conventional semiconductor integrated circuit device.

Referring to FIG. 13, a sub-clock line 3 in a semiconductor integrated circuit device 10 is connected to a clock trunk 1 through a clock driver 2. A plurality of signal lines 4a to 4f are connected to sub-clock line 3. A plurality of latch circuits LT's are connected to each of signal lines 4a to 4f.

A clock signal CLK is outputted from a clock circuit which is not shown in FIG. 13. Clock signal CLK is transmitted from clock trunk 1 to sub-clock line 3 through clock driver 2. Main drivers 5a to 5f are inserted into respective signal lines 4a to 4f. Main drivers 5a to 5f receive clock signal CLK from sub-clock line 3 and outputs clock signals CLK to the plural latch circuits LT's connected to signal lines 4a to 4f, respectively.

In FIG. 13, since the numbers of latch circuits connected to respective signal lines 4a to 4f are different, signal lines 4a to 4f have different connection capacities. The different connection capacities cause a clock skew.

On signal line 4a having the largest number of latch circuits connected thereto, a latch circuit LT1 is one connected to signal line 4a located at the farthest position from the node between signal line 4a and sub-clock line 3. On signal line 4f having the smallest number of latch circuits connected thereto, a latch circuit LT2 is one connected to signal line 4f located at the nearest position from the node between signal line 4f and sub-clock line 3. A large difference, i.e., a large clock skew is generated between time at which clock signal CLK outputted from clock driver 2 arrives at latch circuit LT1 and time at which clock signal CLK outputted from clock driver 2 arrives at latch circuit LT2. It is necessary to fall the clock skew within an allowable range. If a clock skew exceeding the allowable range occurs, circuits in the semiconductor integrated circuit device or the wiring layout thereof should be changed.

SUMMARY OF THE INVENTION

It is an object of the present invention to provide a semiconductor integrated circuit device capable of reducing a clock skew.

The semiconductor integrated circuit device according to the present invention includes a clock signal transmission line including a plurality of straight portions arranged side by side with their longitudinal directions approximately in parallel with each other and forming a path from a point on the line via the plurality of straight portions one after another along their longitudinal directions to reach another point on the line. The clock signal transmission line further includes at least one portion located between two of the plurality of straight portions through which the clock signal having been transmitted on one of the two straight portions in one direction along the longitudinal direction is guided such that the same clock signal is transmitted on the other of the two straight portions in the opposite direction along the longitudinal direction.

A plurality of signal lines each supplying the clock signal to at least one storage circuit includes a first signal line connected to a first straight portion among the plurality of straight portions and a second signal line connected to a second straight portion among the plurality of straight portions that is different from the first straight portion.

There occurs a time difference between the timing at which the clock signal arrives at the connect point of the first signal line to the first straight portion and the timing at which the clock signal arrives at the connect point of the second signal line to the second straight portion. Such a time difference can be utilized to readily suppress a clock skew of the clock signal distributed to each signal line.

The wiring method according to the present invention includes a first step of calculating, for each of a plurality of signal lines, a delay time in which a clock signal is transmitted from a point on the relevant signal line to a storage circuit located at a farthest position from the point, a second step of generating and arranging, as one or more clock signal transmission lines, one or more folded (or bent) wiring each including a plurality of straight portions arranged side by side with their longitudinal directions approximately in parallel with each other and forming a path from a point on the wiring via the plurality of straight portions one after another along their longitudinal directions to reach another point on the wiring, and a third step of calculating, based on the respective delay times of the plurality of signal lines, connect points where the plurality of signal lines are connected to the one or more clock signal transmission lines.

The connect points of the signal lines to the clock signal transmission lines are determined taking account of the delay times of the respective signal lines. Accordingly, it is possible to readily suppress a clock skew utilizing time differences arising among the timings at which the clock signal arrives at different connect points on the one or more clock signal transmission lines.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
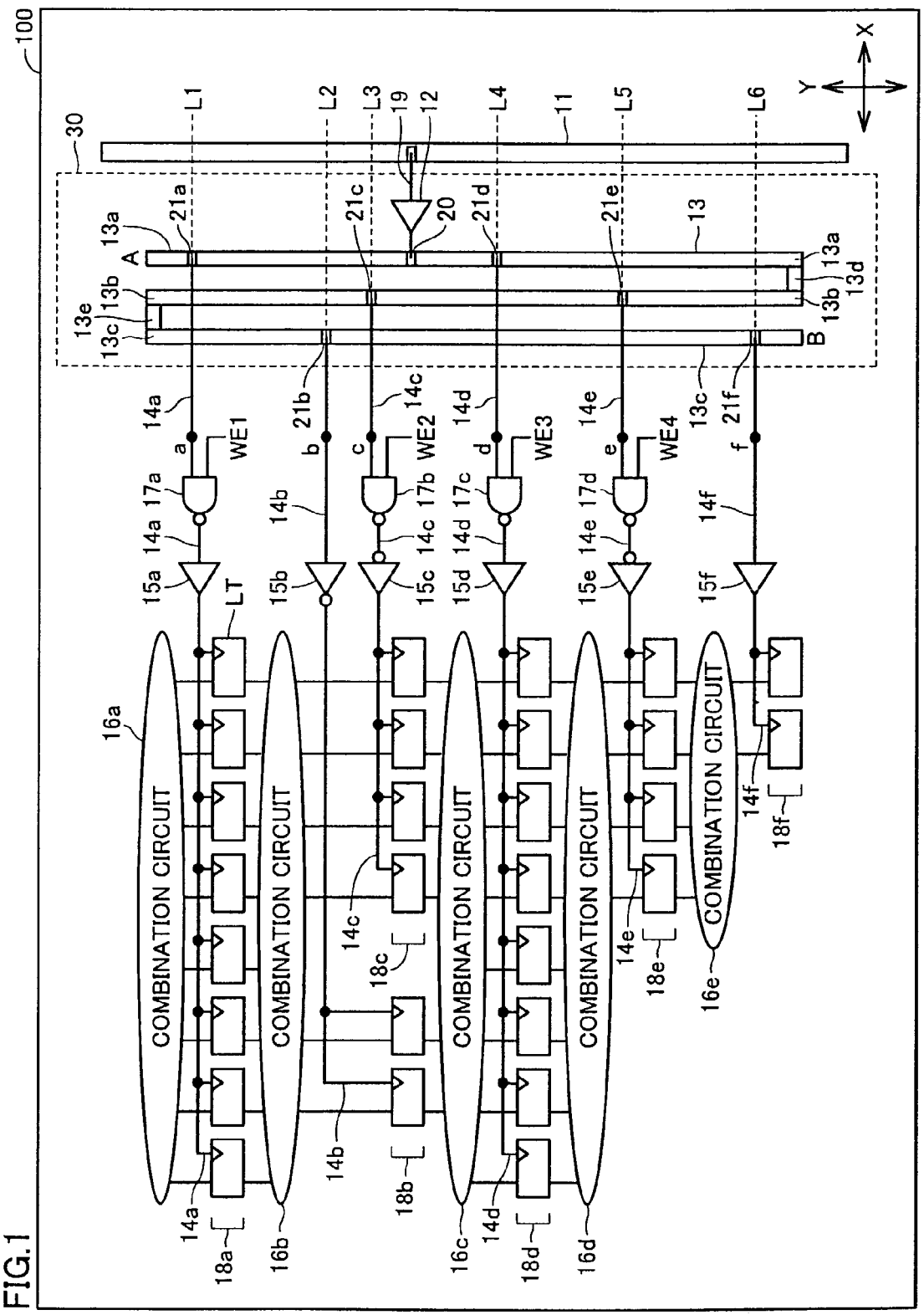
FIG. 1 is a block diagram showing the overall configuration of a semiconductor integrated circuit device in a first embodiment according to the present invention.

FIG. 1 is a block diagram showing the overall configuration of a semiconductor integrated circuit device in a first embodiment according to the present invention.

Referring to FIG. 1, a semiconductor integrated circuit device 100 includes a clock trunk 11, a clock signal transmission circuit 30, signal lines 14a to 14f, main drivers 15a to 15f, combination circuits 16a to 16e, logical gates 17a to 17d and latch circuit groups 18a to 18f each including a plurality of latch circuits LT's. Clock signal transmission circuit 30 includes a clock driver 12 and a clock signal transmission line 13.

Clock signal transmission line 13 is arranged between clock driver 12 and main drivers 15a to 15f.

Clock signal transmission line 13 includes a plurality of straight portions 13a to 13c arranged along a direction X and extended in a direction Y perpendicular to direction X, a bent portion 13d connecting one ends of straight portions 13a and 13b to each other in direction X, and a bent portion 13e connecting the other end of straight portion 13b to one end of straight portion 13c. Clock signal transmission line 13 transmits clock signal CLK to an end portion B by way of straight portions 13a to 13c along direction Y in this order.

A plurality of signal lines 14a to 14f receive clock signal CLK from clock signal transmission line 13 and transmit clock signal CLK to a plurality of latch circuit groups 18a to 18f connected thereto, respectively.

One or a plurality of latch circuits LT's are connected to each of signal lines 14a to 14f. Latch circuit group 18a connected to signal line 14a include eight latch circuits LT's. That is, eight latch circuits LT's are connected to signal line 14a. Likewise, latch circuit group 18b connected to signal line 14b include two latch circuits. Latch circuit group 18c connected to signal line 14c include four latch circuits LT's. Latch circuit group 18d connected to signal line 14d include eight latch circuits LT's. Latch circuit group 18e connected to signal line 14e include four latch circuits LT's. Latch circuit group 18f connected to signal line 14f include two latch circuits LT's.

Clock driver 12 receives clock signal CLK from clock trunk 11 and transmits clock signal CLK to clock signal transmission line 13. Clock driver 12 outputs clock signal CLK equal in phase (equal in logical level) to inputted clock signal CLK.

Main drivers 15a to 15f are inserted into signal lines 14a to 14f, respectively. Each of drivers 15a to 15f receives clock signal CLK from clock signal transmission line 13 and supplies clock signal CLK to a plurality of latch circuits LT's. Each of drivers 15a, 15d and 15f outputs clock signal CLK equal in phase to inputted clock signal CLK. Each of drivers 15b, 15c and 15e outputs a complementary clock signal /CLK to inputted clock signal CLK.

Each of drivers 12 and 15a to 15f consists of, for example, one CMOS inverter circuit or a plurality of serially connected CMOS inverter circuits.

Each of combination circuits 16a to 16e consists of a combination of a plurality of logical gates such as an NAND logical gate, an NOR logical gate and an inverter circuit.

Combination circuit 16a outputs data of a total of eight bits to eight latch circuits LT's in latch circuit group 18a connected to signal line 14a, respectively. Combination circuit 16b receives the data held by latch circuit group 18a, performs a predetermined logical operation and outputs the operation result to latch circuit groups 18b and 18c. Combination circuit 16c receives the data held by latch circuit groups 18b and 18c, performs a predetermined logical operation and outputs the operation result to latch circuit group 18d.

Combination circuit 16d receives the data held by latch circuit group 18d, performs a predetermined logical operation and outputs the operation result to latch circuit group 18e. Combination circuit 16e receives the data held by latch circuit group 18e, performs a predetermined logical operation and outputs the operation result to latch circuit group 18f.

Latch circuit groups 18a to 18f fetch one-bit data synchronously with the rise (or fall) of clock signal CLK applied from signal lines 14a to 14f and hold the fetched data, respectively. It is noted that NAND logical gates 17a to 17d controlling data write to a plurality of latch circuits LT's connected to signal lines 14a, 14c, 14d and 14e are inserted into signal lines 14a, 14c, 14d and 14e, respectively.

NAND logical gate 17a outputs an H-level signal when a write enable signal WE1 is at an L level. In this case, therefore, no data is written to eight latch circuits LT's in latch circuit group 18a. NAND logical gate 17b outputs an H-level signal when a write enable signal WE2 is at an L level. In this case, therefore, no data is written to four latch circuits LT's in latch circuit group 18b. NAND logical gate 17c outputs an H-level signal when a write enable signal WE3 is at an L level. In this case, therefore, no data is written to eight latch circuits LT's in latch circuit group 18d. NAND logical gate 17d outputs an H-level signal when a write enable signal WE4 is at an L level. In this case, therefore, no data is written to four latch circuits LT's in latch circuit group 18e.

NAND logical gates 17a to 17d conducting the above-stated write control are inserted into all of signal lines 14a to 14f or not inserted into any of these signal lines 14a to 14f.

Semiconductor integrated circuit device 100 shown in FIG. 1 is formed to be integrated on one main surface of a single silicon substrate. A plurality of wiring layers mainly containing aluminum or copper are formed in a layered manner in an interlayer insulating film on the silicon substrate, clock trunk 11 and clock signal transmission line 13 are formed on the first wiring layer among the plural wiring layers, and a plurality of signal lines 14a to 14f and a wiring 19 connecting clock trunk 11 to clock signal transmission line 13 through clock driver 12 are formed on the second wiring layer different from the first wiring layer.

The output of clock driver 12 is connected to a part between the both ends of straight portion 13a of clock signal transmission line 13 through a via contact 20 extended in a direction perpendicular to the main surface of the silicon substrate. Clock signal CLK is, therefore, propagated from via contact 20 toward end portion B on clock signal transmission line 13. In addition, clock signal CLK is propagated from via contact 20 toward end portion A on straight portion 13a.

Respective signal lines 14a to 14f are also connected to an intermediate clock trunk in a direction perpendicular to the main surface of the silicon substrate through the via contact.

Signal lines 14a to 14f involve at least two signal lines having different number of latches connected thereto. Due to this, time required for clock signal CLK to arrive from a branch point on clock signal transmission line 13 at the latch circuit located at the farthest position from the branch point differs according to the signal lines. In this embodiment, while considering the number of latch circuits connected to each signal line and the entire wiring length of each signal line, the branch points of the respective signal lines from clock signal transmission line 13 are determined so as to reduce a clock skew as follows:

Straight lines L1 to L6 are virtual lines passing through points a to f on signal lines 14a to 14f and extended in direction X, respectively. In addition, points a to f are present at positions at which respective straight lines L1 to L6 intersect all of a plurality of straight portions 13a to 13c in clock signal transmission line 13, respectively. The node between each of signal lines 14a to 14f and clock signal transmission line 13 is assumed to be one of the three portions on which each of straight lines L1 to L6 intersects straight line portions 13a to 13c.

Next, a method for determining the node between each of signal lines 14a to 14f and clock signal transmission line 13 will be described.

The connection of many latch circuits LT to one signal line is one of causes for lengthening the propagation delay of clock signal CLK. Accordingly, the signal lines each having the largest number of latch circuits LT's connected thereto will be considered first.

The signal lines each having the largest number of latch circuits LT's connected thereto are signal lines 14a and 14d. Signal line 14a is connected to clock signal transmission line 13 so that time required for clock signal CLK to arrive at latch circuit LT connected to signal line 14a at the farthest position from via contact 20 among a plurality of latch circuits LT's connected to signal line 14a becomes the shortest. Likewise, signal line 14d is connected to clock signal transmission line 13 so that time required for clock signal CLK to arrive at latch circuit LT connected to signal line 14d at the farthest position from via contact 20 among a plurality of latch circuits LT's connected to signal line 14d becomes the shortest. As a result, signal lines 14a and 14d are connected to straight portion 13a nearest from clock driver 12 in clock signal transmission line 13. Via contacts 21a and 21d are provided at intersections between straight lines L1 and L4 and straight portion 13a, respectively. Signal line 14a is connected to clock signal transmission line 13 through via contact 21a and signal line 14d is connected to clock signal transmission line 13 through via contact 21d.

That is to say, signal lines 14a and 14d are extended to at least via contacts 21a and 21b from points a and d along direction X and connected to straight portion 13a through via contacts 21a and 21d, respectively. Each of signal lines 14a and 14d is not connected to straight portions 13b and 13c. Further, each of signal lines 14a and 14d intersects straight portions 13b and 13c while facing each other with an insulating film put therebetween in directions perpendicular to the main surface of the substrate (perpendicular to directions X and Y).

After determining the nodes between signal lines 14 each having the largest number of latch circuits LT's connected thereto and clock signal line 13, respectively, the nodes between other signal lines 14 and clock signal line 13 are determined. The determination conditions will be described below.

For a certain signal line 14, time required for clock signal CLK to arrive at latch circuit located at the nearest position from clock driver 12 among a plurality of latch circuits LT's connected to the certain signal line 14 is assumed as shortest delay time and time required for clock signal CLK to arrive at latch circuit LT located at the farthest position from clock driver 12 is assumed as longest delay time.

The shortest delay time and the longest delay time of each signal line 14 having the largest number of latch circuits connected thereto can be already calculated. The shortest delay time and the longest delay time are assumed as T1 and T2 (T1<T2), respectively. If there are not less than two signal lines (14a and 14d) each having the largest number of latch circuits connected thereto as shown in FIG. 1, the shorter time of the shortest delay time of one signal line (14a) and the shortest delay time of the other signal line (14d) is assumed as T1 and the longer time of the longest delay time of one signal line (14a) and the longest delay time of the other signal line (14d) is assumed as T2.

Time T1 and T2 are set as reference time. The nodes between the other signal lines and clock signal transmission line 13 are determined so that the shortest delay time is not less than time T1 and the longest delay time is not more than time T2 for the signal lines other than the signal lines having the largest number of latch circuits connected thereto. It is noted that the node between signal line 14 to which one latch circuit LT is connected and clock signal transmission line 13 is determined while assuming that the shortest delay time is equal to the longest delay time.

The use of clock signal transmission line 13 in this embodiment facilitates layout design for satisfying the above-stated conditions compared with the conventional technique.

First, as for signal lines 14b and 14f each having the smallest number of latch circuits LT's connected thereto, time required for clock signal CLK to arrive from each node at latch circuit LT located at the farthest position from clock driver 12 is shorter than that for the other signal lines 14. Due to this, as shown in FIG. 1, signal lines 14b and 14f may be connected to straight portion 13c located at the farthest position from clock driver 12. Via contacts 21b and 21f are provided at the intersections between straight lines L2 and L6 and straight portion 13c, respectively. Signal lines 14b and 14f are extended to at least via contacts 21b and 21f from points b and f along direction X and connected to straight portion 13c through via contacts 21b and 21f, respectively.

Signal lines 14c and 14e each having the intermediate number of latch circuits LT's connected thereto among a plurality of signal lines 14 may be connected to straight portion 13b having an intermediate distance from clock driver 12 among straight portions 13a to 13c. Via contacts 21c and 21e are provided at the intersections between straight lines L3 and L5 and straight portion 13b, respectively. Signal lines 14c and 14e intersect straight portion 13c, are extended from points c and e to at least via contacts 21c and 21e along direction X, and connected to straight portion 13b through via contacts 21c and 21e, respectively. Signal lines 14c and 14e are not connected to straight portion 13c but intersect straight portion 13c while facing each other with the insulating film put therebetween in directions perpendicular to directions X and Y.

On the route on clock signal transmission line 13 from via contact 20 to end portion B, clock signal CLK arrives at branch points in the order of via contacts 21d, 21e, 21c, 21b and 21f.

Here, the wiring length of clock signal transmission line 13, i.e., the wiring distance from end portion A to end portion B may be set to be equal to or larger than a length corresponding to time required for clock signal CLK to arrive at latch circuit LT located at the farthest position from main driver 15 on signal line 14 having the largest number of latch circuits LT's connected thereto.

In other words, if it is assumed that clock driver 12 is connected to end portion A and signal line 14 is not connected to clock signal line 13, the length of clock signal transmission line 13 is determined so that time required for clock signal CLK to arrive from end portion A at end portion B becomes equal to or longer than time required for clock signal CLK to arrive from main driver 15 on signal line 14 having the largest number of latch circuits LT's connected thereto at the input of latch circuit LT located at the farthest position.

As can be understood from the above, for a plurality of signal lines to which different numbers of latch circuits are connected, the nodes between these signal lines and clock signal transmission line 13 are determined such that time required for clock signal CLK to arrive at the node between the clock signal transmission line and one of the signal lines to which more latch circuits are connected becomes shorter than time required for clock signal CLK to arrive at the node between the clock signal transmission line and another one of the signal lines to which fewer larch circuits are connected. By so determining, it is possible to reduce a clock skew.

As described in this embodiment, clock signal transmission line 13 to which the signal lines are connected is constituted out of the clock signal transmission line and time required for propagating the clock signal can be set different between at least two straight portions facing each other.

Due to this, it suffices to make a simple change in layout when adjusting a clock skew.

Clock signal transmission line 13 shown in FIG. 1 may be formed so as to be further extended from one of or both of end portions A and B and to distribute clock signal CLK to other latch circuits LT's which are not shown in FIG. 1 if necessary. Further, while clock signal transmission line 13 shown in FIG. 1 has two bent portions and three straight potions facing one another on one route, these numbers are not limited thereto. The number of straight portions may be changed to two or not less than four if necessary.

Moreover, the storage circuits to which the signal lines are connected are not limited to the latch circuits but may be flip-flop circuits.

Second Embodiment

Figure 2:
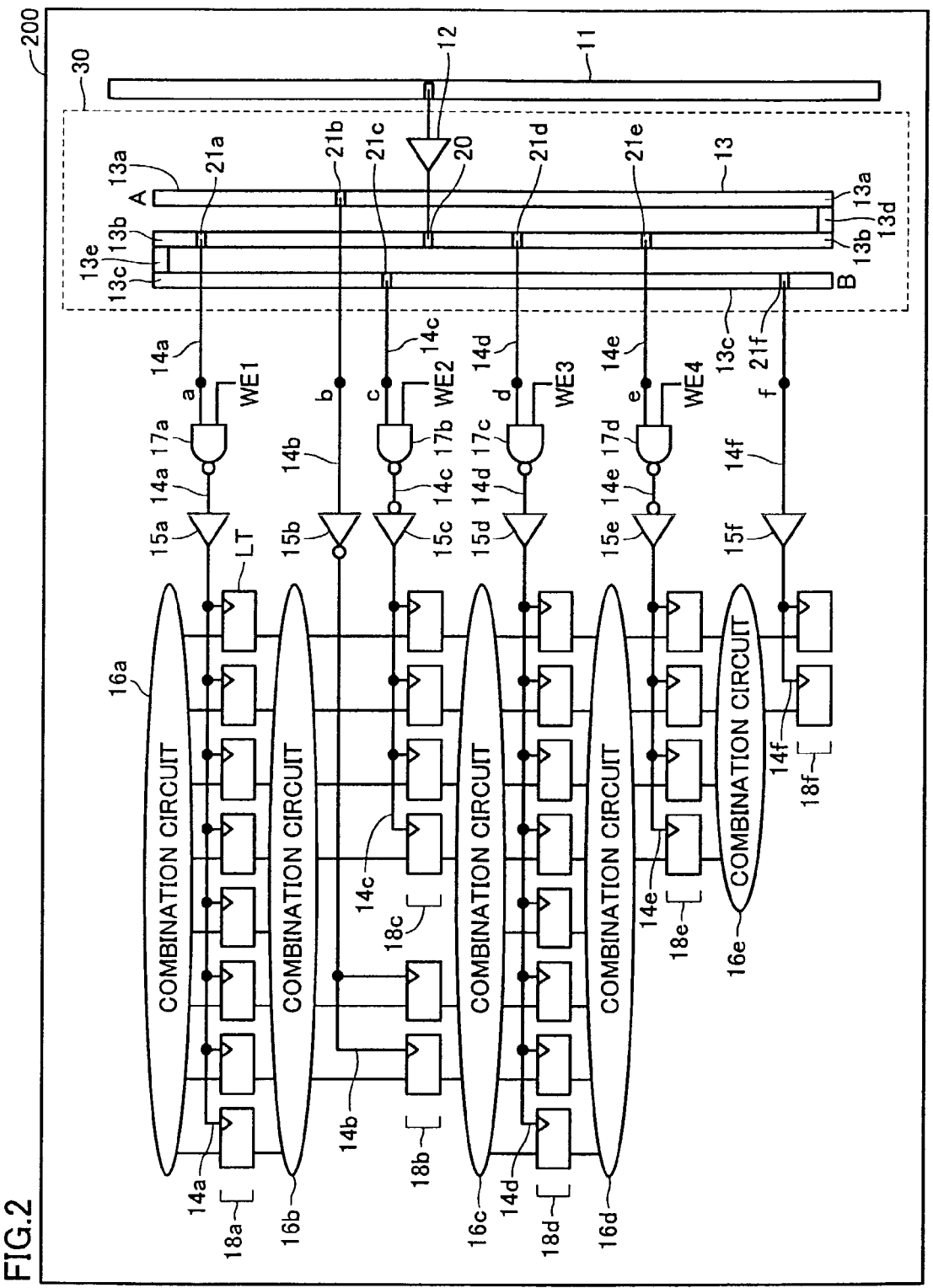
FIG. 2 is a block diagram showing the overall configuration of a semiconductor integrated circuit device in a second embodiment according to the present invention.

FIG. 2 is a block diagram showing the configuration of a semiconductor integrated circuit device in a second embodiment according to the present invention. In this embodiment, the output terminal of a clock driver 12 in a semiconductor integrated circuit device 200 is connected to the center of a clock signal transmission line 13 through a via contact 20. Accordingly, the distance from via contact 20 to one end portion A of clock signal transmission line 13 is equal to the distance from via contact 20 to the other end portion B of clock signal transmission line 13. A clock signal CLK is propagated from via contact 20 toward end portion B on clock signal transmission line 13. On clock signal transmission line 13, a bent portion 13e for propagating clock signal CLK, propagated to a straight portion 13b, to another straight portion 13c is present between via contact 20 and end portion B. Clock signal CLK is also propagated on clock signal transmission line 13 from via contact 20 toward end portion A. On clock signal transmission line 13, a bent portion 13d for propagating clock signal CLK, propagated to a straight portion 13b, to another straight portion 13a is present between via contact 20 and end portion A.

Signal lines 14a and 14d are connected to straight portion 13b through via contacts 21a and 21d, respectively. Signal lines 14c and 14f are connected to straight portion 13c through via contacts 21c and 21f, respectively. Signal lines 14b and 14e are connected to straight portion 13a through via contacts 21b and 21e, respectively. Therefore, via contacts 21d, 21e and 21b are formed in this order along a route from via contact 20 toward end portion A on clock signal transmission line 13. In addition, via contacts 21a, 21c and 21f are formed in this order along a route from via contact 20 to end portion B on clock signal transmission line 13.

The other constituent elements of semiconductor integrated circuit device 200 are the same as those in the first embodiment and will not be, therefore, repeatedly described herein.

If designing the layout of semiconductor integrated circuit device 200 in this embodiment, a plurality of types of clock signal transmission circuits 30 each consisting of clock signal transmission line 13 and clock driver 12 are prepared in advance as a layout design cell library. That is to say, a plurality of types of clock signal transmission circuits having different wiring lengths of clock signal transmission lines 13, having different sizes of clock drivers 12 and the like are prepared. If semiconductor integrated circuit device 200 is to be designed, therefore, a preferable clock signal transmission circuit is selected from among the clock signal transmission circuits thus prepared in accordance with a plurality of signal lines to which clock signal CLK is transmitted in semiconductor integrated circuit device 200.

In the second embodiment, it is possible to shorten layout design operation time. To this end, it is preferable that clock signal transmission circuit 30 is such that the output of clock driver 12 is connected to the intermediate point of clock signal transmission line 13 as shown in FIG. 2. The clock signal transmission circuit is not, however, limited to that shown in FIG. 2 but clock driver 12 may be connected to the other portion of dock signal transmission line 13.

Third Embodiment

Figure 3:
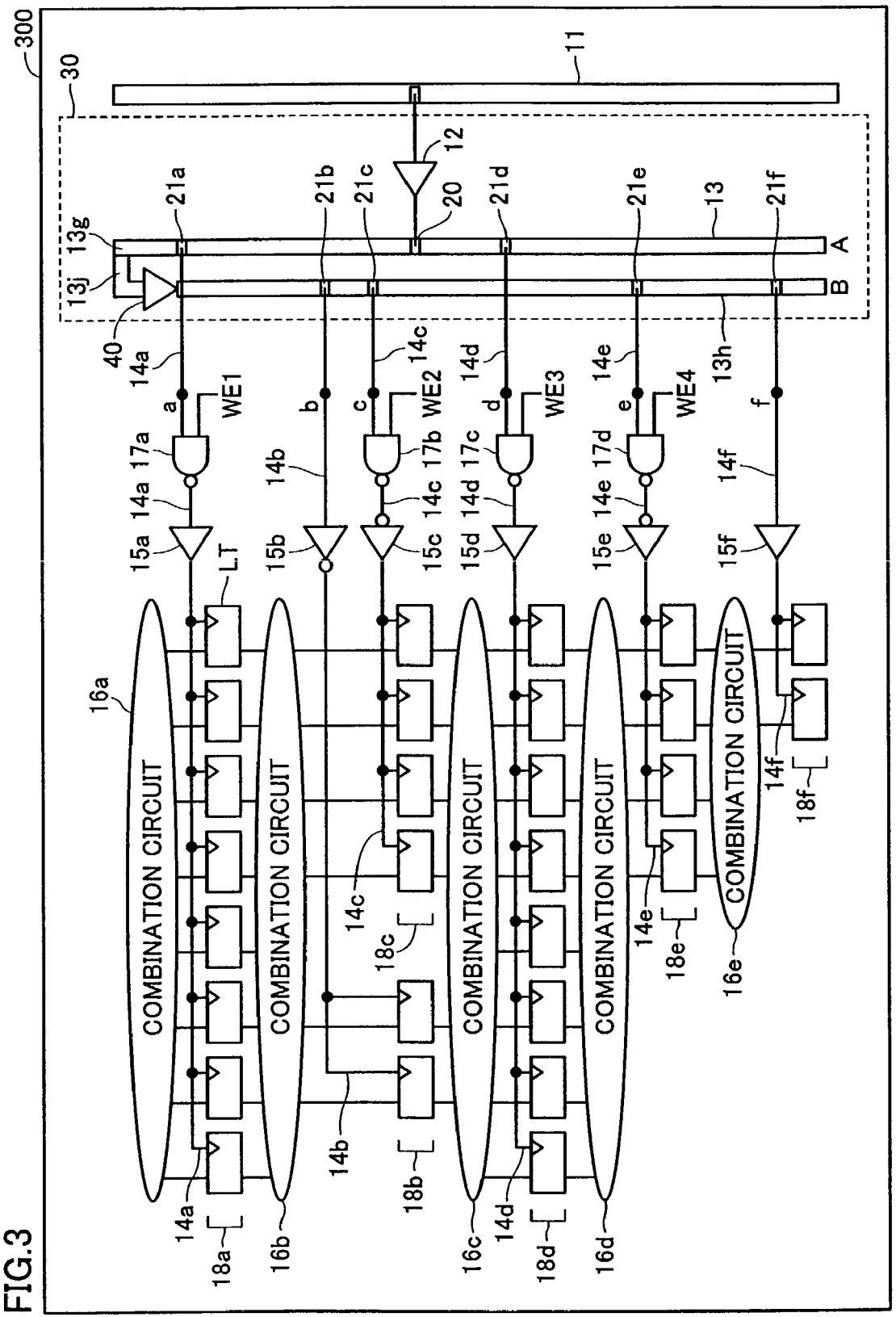
FIG. 3 is a block diagram showing the overall configuration of a semiconductor integrated circuit device in a third embodiment according to the present invention.

FIG. 3 is a block diagram showing the configuration of a semiconductor integrated circuit device in a third embodiment according to the present invention.

Referring to FIG. 3, a clock signal transmission line 13 in a semiconductor integrated circuit device 300 includes two straight portions 13g and 13h and a bent portion 13j. The output terminal of a clock driver 12 is connected to one portion of straight portion 13g through a via contact 20. Each of signal lines 14a to 14f is connected to either straight portion 13g or 13h so as to reduce a clock skew. The determination method for the nodes of signal lines 14a to 14f is the same as that described in the first embodiment.

In this embodiment, signal lines 14a and 14d are connected to, for example, straight portion 13g, to which the output of clock driver 12 is connected, through via contacts 21a and 21d, respectively. The other signal lines are connected to straight portion 13h through via contacts, respectively.

Clock signal transmission line 13 further includes a delay circuit 40 between bent portion 13*j* and straight portion 13*h*. Delay circuit 40 delays a clock signal CLK propagated from straight portion 13*g* and bent portion 13*j* and supplies delayed clock signal CLK to straight portion 13*h*. Delay circuit 40 consists of, for example, even-numbered CMOS inverter circuits connected in series.

The wiring length of clock signal transmission line 13 (wiring distance from an end portion A to an end portion B) is preferably set to be equal to or larger than a length corresponding to time required for clock signal CLK to arrive from a main driver 15 to latch circuit LT located at the farthest position from main driver 15 on signal line 14 having the largest number of latch circuits LT's connected thereto. Namely, if it is assumed that the output terminal of clock driver 12 is connected to end portion A and a signal line is not connected to clock signal transmission line 13, the wiring length of clock signal transmission line 13 is determined so that time required for clock signal CLK to be transmitted from end portion A to end portion B of clock signal transmission line 13 becomes equal to or longer than time T required for clock signal CLK to arrive from main driver 15 to latch circuit LT located at the farthest position from main driver 15 on signal line 14 having the largest number of latch circuits LT's connected thereto. At this time, it is preferable that delay time of clock signal CLK generated by delay circuit 40 is set to be about half of time T. The other constituent elements of semiconductor integrated circuit device 300 are the same as those in the first embodiment.

According to this embodiment, it is possible to shorten the wiring length of clock signal transmission line 13 by providing delay circuit 40. This can, therefore, contribute to the reduction of layout.

Fourth Embodiment

Figure 4:
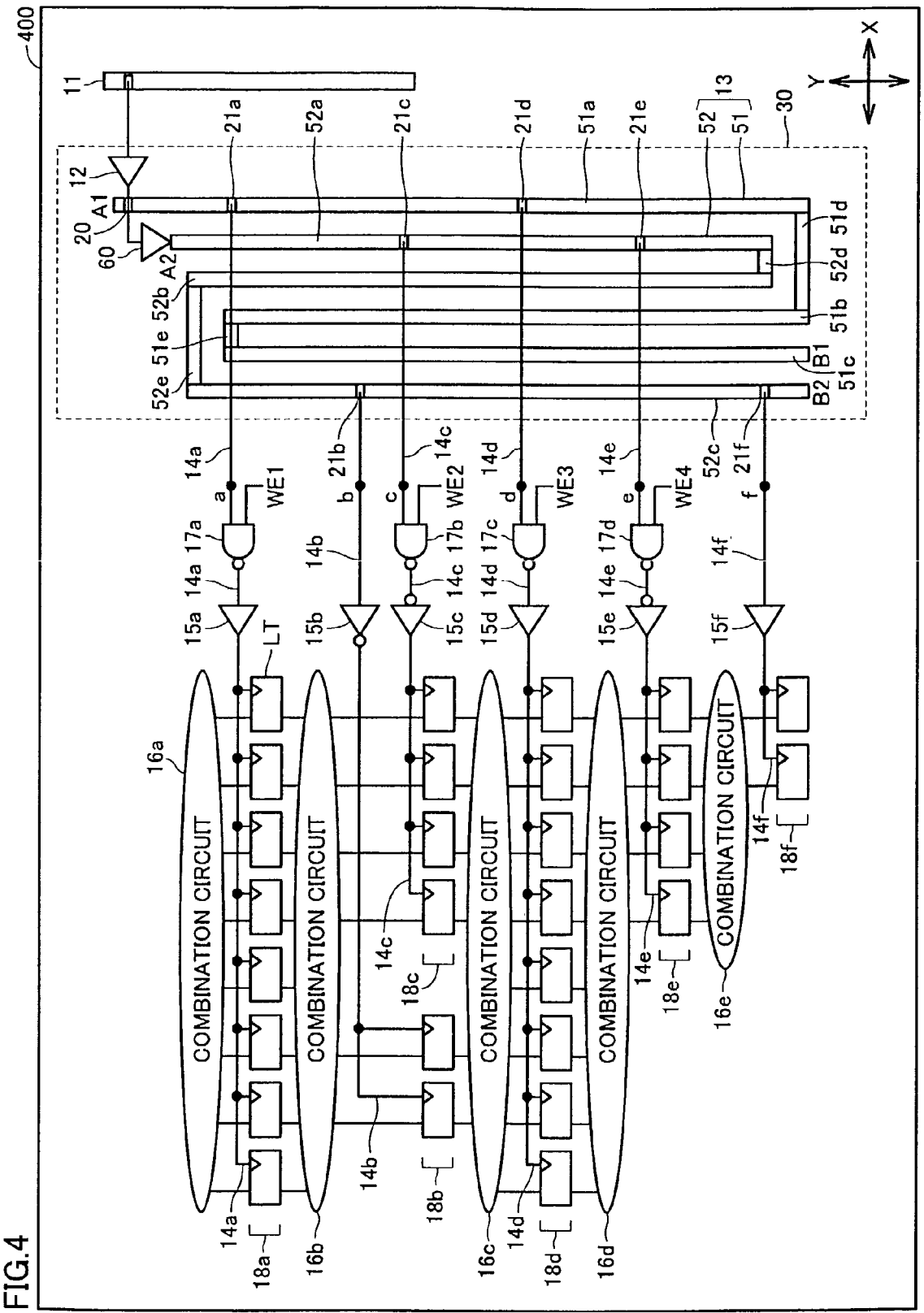
FIG. 4 is a block diagram showing the overall configuration of a semiconductor integrated circuit device in the fourth embodiment according to the present invention.

FIG. 4 is a block diagram showing the configuration of a semiconductor integrated circuit device in a fourth embodiment according to the present invention.

Referring to FIG. 4, a clock signal transmission circuit 30 includes first and second clock signal transmission lines 51 and 52.

First clock signal transmission line 51 includes straight portions 51*a* to 51*c* arranged in a direction Y and bent portions 51*d* and 51*e*. Bent portion 51*d* connects the end portion of straight portion 51*a* to the end portion of straight portion 51*b* in a direction X. Bent portion 51*e* connects the end portion of straight portion 51*b* which end portion is not connected to bent portion 51*d* to the end portion of straight portion 51*c* in direction X. If the end portion of straight portion 51*a* which end portion is not connected to bent portion 51*d* is assumed as an end portion A1 and the end portion of straight portion 51*c* which end portion is not connected to bent portion 51*e* is assumed as an end portion B1, then first clock signal transmission line 51 constitutes a route from end portion A1 to end portion B1.

Second clock signal transmission line 52 includes straight portions 52*a* to 52*c* arranged in direction Y and bent portions 52*d* and 52*e*. Bent portion 52*d* connects the end portion of straight portion 52*a* to the end portion of straight portion 52*b* in direction X. Bent portion 52*e* connects the end portion of straight portion 52*b* which end portion is not connected to bent portion 52*d*, to the end portion of straight portion 52*c* in direction X. If the end portion of straight portion 52*a* which end portion is not connected to bent portion 52*d* is assumed as an end portion A2 and the end portion of straight portion 52*c* which end portion is not connected to bent portion 52*e* is assumed as an end portion B2, then second clock signal transmission line 52 constitutes a route from end portion A2 to end portion B2.

The output terminal of clock driver 12 is connected to end portion A1 of clock signal transmission line 51 through a via contact 20. Clock signal CLK is propagated from end portion A1 to end portion B1 along clock signal transmission line 51.

Semiconductor integrated circuit device 400 further includes a delay circuit 60 between the output terminal of clock driver 12 and end portion A2 of second clock signal transmission line 52. Delay circuit 60 delays clock signal CLK received from clock driver 12 and supplies delayed clock signal CLK to end portion A2 of second clock signal transmission line 52. Delay time generated by delay circuit 60 is set to be at least the same as time required for clock signal CLK to be propagated from end portions A1 to B1 on first clock signal transmission line 51. Therefore, clock signal CLK starts from end portion A2 of second clock signal transmission line 52 after arriving at end portion B1 of first clock signal transmission line 51 and clock signal CLK is then propagated toward end portion B2.

Consequently, time required for propagating clock signal CLK is shorter in the order of straight portions 51*a*, 51*b*, 51*c*, 52*a*, 52*b* and 52*c*.

The determination method for the nodes of signal lines 14*a* to 14*f* is the same as that described in the first embodiment.

As a result of the determination, as shown in, for example, FIG. 4, signal lines 14*a* and 14*d* each having the largest number of latch circuits LT's connected thereto are connected to straight portion 51*a* of first clock signal transmission line 51. In addition, signal lines 14*b* and 14*f* each having the smallest number of latch circuits LT's connected thereto are connected to straight portion 52*c* of second clock signal transmission line 52. Remaining signal lines 14*c* and 14*e* are connected to straight portion 52*a* of second clock signal transmission line 52. As a result, time required for clock signal CLK to arrive at a signal line is shorter in the order of signal lines 14*a*, 14*d*, 14*c*, 14*e*, 14*b* and 14*f*.

In this case, the wiring length of each of clock signal transmission lines 51 and 52 is preferably set to be about half or larger than a length corresponding to time required for clock signal CLK to arrive from main driver 15 to latch circuit LT located at the farthest position from main driver 15 on signal line 14 having the largest number of latch circuits LT's connected thereto. Namely, time required for clock signal CLK to be transmitted from end portion A1 to end portion B1 of first clock signal transmission line 51 and time required for clock signal CLK to be transmitted from end portion A2 to end portion B2 of second clock signal transmission line 52 are set to be about half the time required for clock signal CLK to start from main driver 15 and to arrive at latch circuit LT located at the farthest from main driver 15 on signal line 14 having the largest number of latch circuits LT's connected thereto.

The other constituent elements of semiconductor integrated circuit device 400 are the same as those of semiconductor integrated circuit device 100 and will not be, therefore, repeatedly described herein.

As can be understood from the above, the selection range of the nodes with a plurality of signal lines widens by providing the clock signal transmission circuit with a plurality of clock signal transmission lines. As a result, it is possible to adjust a clock skew with higher accuracy.

Furthermore, delay circuit 60 of clock signal transmission circuit 30 has a function of delaying clock signal CLK and a function, as a driver, of driving second clock signal transmission line 52.

While clock signal transmission circuit 30 includes the two clock signal transmission lines in this embodiment, it is also possible that clock signal transmission circuit 30 includes three or more clock signal transmission lines and a plurality of delay circuits adjusting the propagation time for clock signal CLK.

Further, an arrangement method for each clock signal transmission line may be arbitrarily determined.

Fifth Embodiment

Figure 5:
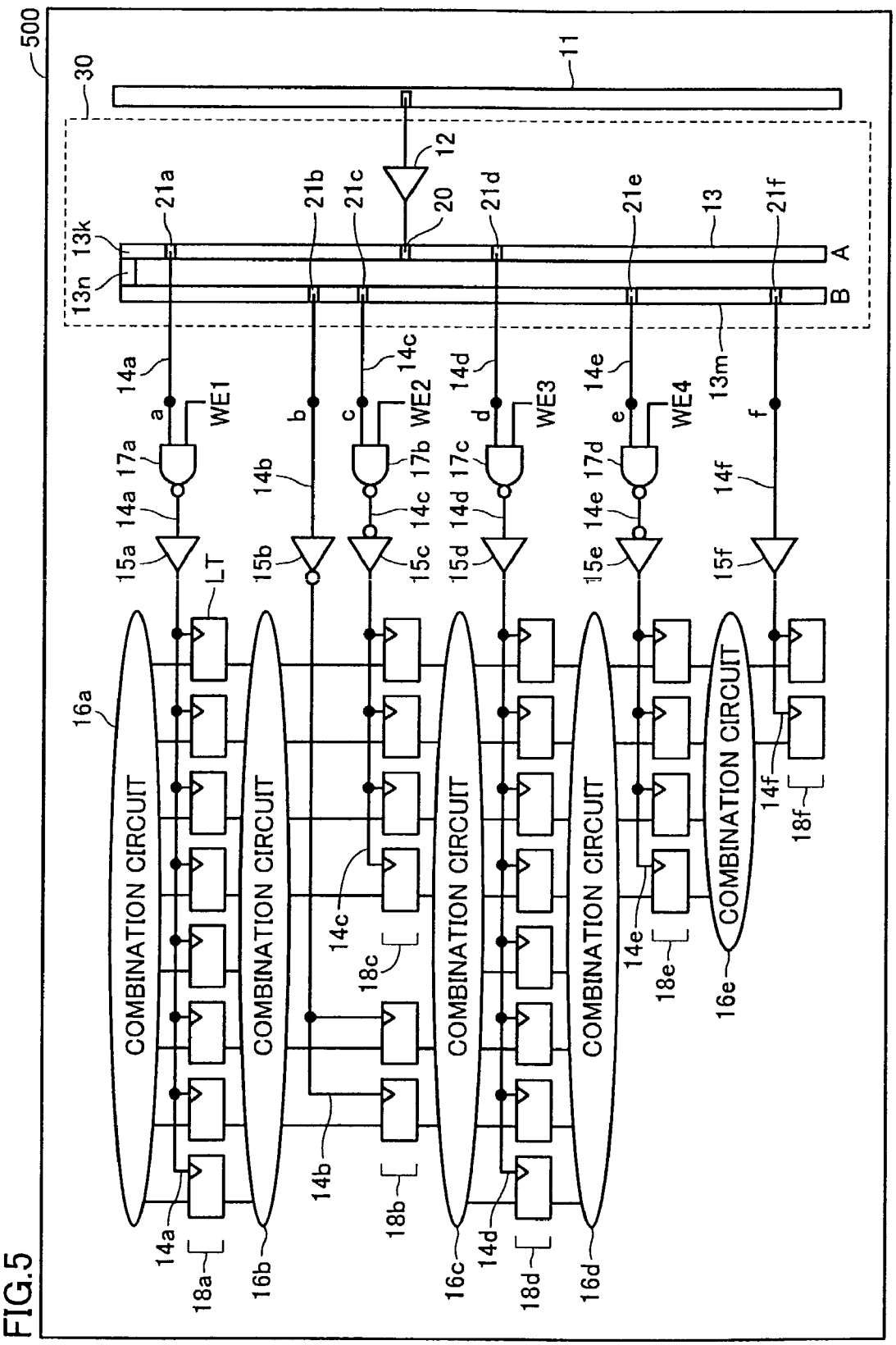
FIG. 5 is a block diagram showing the overall configuration of a semiconductor integrated circuit device in a fifth embodiment according to the present invention.

FIG. 5 is a block diagram showing the configuration of a semiconductor integrated circuit device in a fifth embodiment according to the present invention.

Referring to FIG. 5, a clock signal transmission line 13 includes two straight portions 13$k$ and 13$m$ and a bent portion 13$n$. Bent portion 13$n$ is connected to one end of straight portion 13$k$ and that of straight portion 13$n$. If the end portion of straight portion 13$k$ which end portion is not connected to bent portion 13$n$ is assumed as an end portion A and the end portion of straight portion 13$m$ which end portion is not connected to bent portion 13$n$ is assumed as an end portion B, then the end portions of clock signal transmission line 13 are end portions A and B. The output terminal of a clock driver 12 is connected to one portion of straight portion 13$k$ through a via contact 20.

Clock signal transmission line 13 is formed out of a high resistance material such as polysilicon.

The gate electrode of a field effect transistor constituting each of latch circuit groups 18$a$ to 18$f$ and each of combination circuits in combination circuits 16$a$ to 16$e$ is normally formed out of polysilicon. Clock signal transmission line 13 is formed out of polysilicon as in the case of the gate electrode. On the other hand, signal lines 14$a$ to 14$f$ are formed out of the same wiring layer containing aluminum or copper. As a result, signal lines 14$a$ to 14$f$ are lower in resistance than clock signal transmission line 13.

Each of signal lines 14$a$ to 14$f$ is connected to either straight portion 13$k$ or 13$m$ so as to reduce a clock skew. The determination method for the branch points of signal lines 14$a$ to 14$f$ is the same as that described in the first embodiment. In this embodiment, signal lines 14$a$ and 14$d$ are connected to straight portion 13$k$, to which the output terminal of clock driver 12 is connected, through via contacts 21$a$ and 21$d$, respectively. The other signal lines are connected to straight portion 13$h$ through via contacts, respectively.

The wiring length of clock signal transmission line 13, i.e., the wiring distance from end portion A to end portion B is preferably set to be equal to or larger than a length corresponding to time required for clock signal CLK to arrive from a main driver at a latch circuit LT located at the farthest position from the main driver on the signal line having the largest number of latch circuits LT's connected thereto. Namely, if it is assumed that the output terminal of clock driver 12 is connected to end portion A and none of signal lines 14$a$ to 14$f$ are connected to clock signal transmission line 13, time required for clock signal CLK to be transmitted from end portion A to end portion B is set equal to or longer than time required for clock signal CLK to start from the main driver and arrive at latch circuit LT located at the farthest position from the main driver on the signal line having the largest number of latch circuits LT's connected thereto.

The remaining constituent elements of semiconductor integrated circuit device 500 are the same as those of semiconductor integrated circuit device 100 and will not be, therefore, repeatedly described herein.

In this embodiment, clock signal transmission line 13 is formed out of a material having a higher resistance than that of the material of signal lines 14$a$ to 14$f$. As a result, clock signal propagation speed on clock signal transmission line 13 becomes slow. Due to this, it is possible to shorten the wiring length of clock signal transmission line 13 and to, therefore, reduce layout.

Sixth Embodiment

Figure 6:
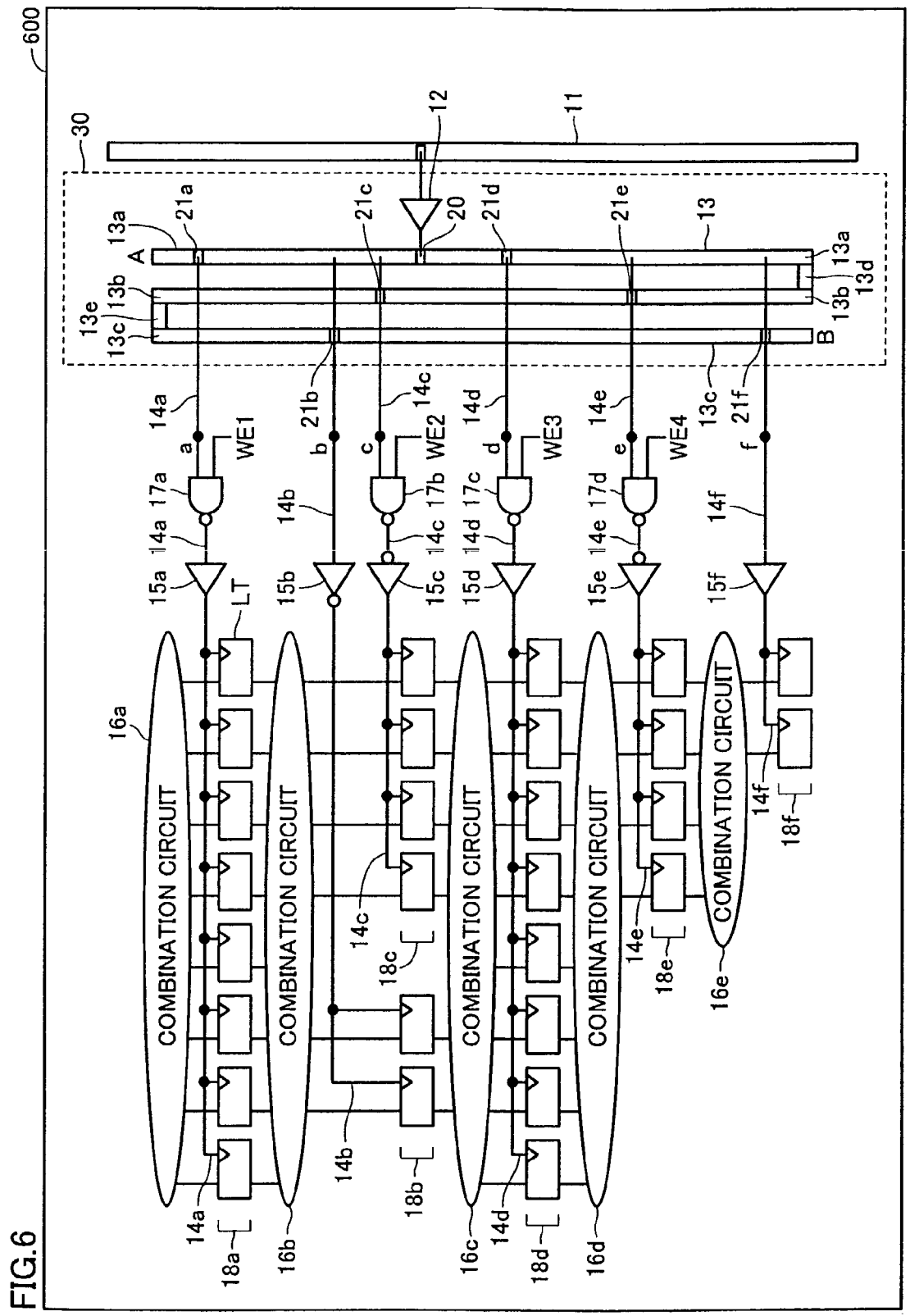
FIG. 6 is a block diagram showing the overall configuration of a semiconductor integrated circuit device in a sixth embodiment according to the present invention.

FIG. 6 is a block diagram showing the configuration of a semiconductor integrated circuit device in a sixth embodiment according to the present invention.

Referring to FIG. 6, each end portion of signal lines 14$a$ to 14$f$ in a semiconductor integrated circuit device 600 is extended to a position at which the end portion intersects straight portion 13$a$ of clock signal transmission line 13. Accordingly, each of signal lines 14$a$ to 14$f$ can be connected to any of straight portions 13$a$ to 13$c$. The above-stated configuration brings about advantages particularly in semiconductor integrated circuit device manufacturing steps.

For example, in the course of manufacturing a semiconductor integrated circuit device, if a clock skew is readjusted after creating masks for transferring circuit patterns, the adjustment can be made only by changing the positions of via contacts.

In other words, signal lines 14$a$ to 14$f$ exist above all straight portions 13$a$ to 13$c$. It, therefore, suffices only to change data on mask patterns for forming via contacts when changing the positions of the via contacts and it is not necessary to change data on mask patterns for forming signal lines 14$a$ to 14$f$. This can reduce mask creation cost.

The configuration, as described in this embodiment, in which signal lines 14$a$ to 14$f$ are redundantly extended so as to be able to be connected to all the straight portions at intervals in a direction perpendicular to the main surface of a substrate, is also applicable to the second to fourth embodiments described above.

Seventh Embodiment

It is obvious that even if the present inventions applied to the first to fifth embodiments stated above are combined according to a layout situation, the effect of reducing a clock skew can be obtained.

Eighth Embodiment

Figure 7:
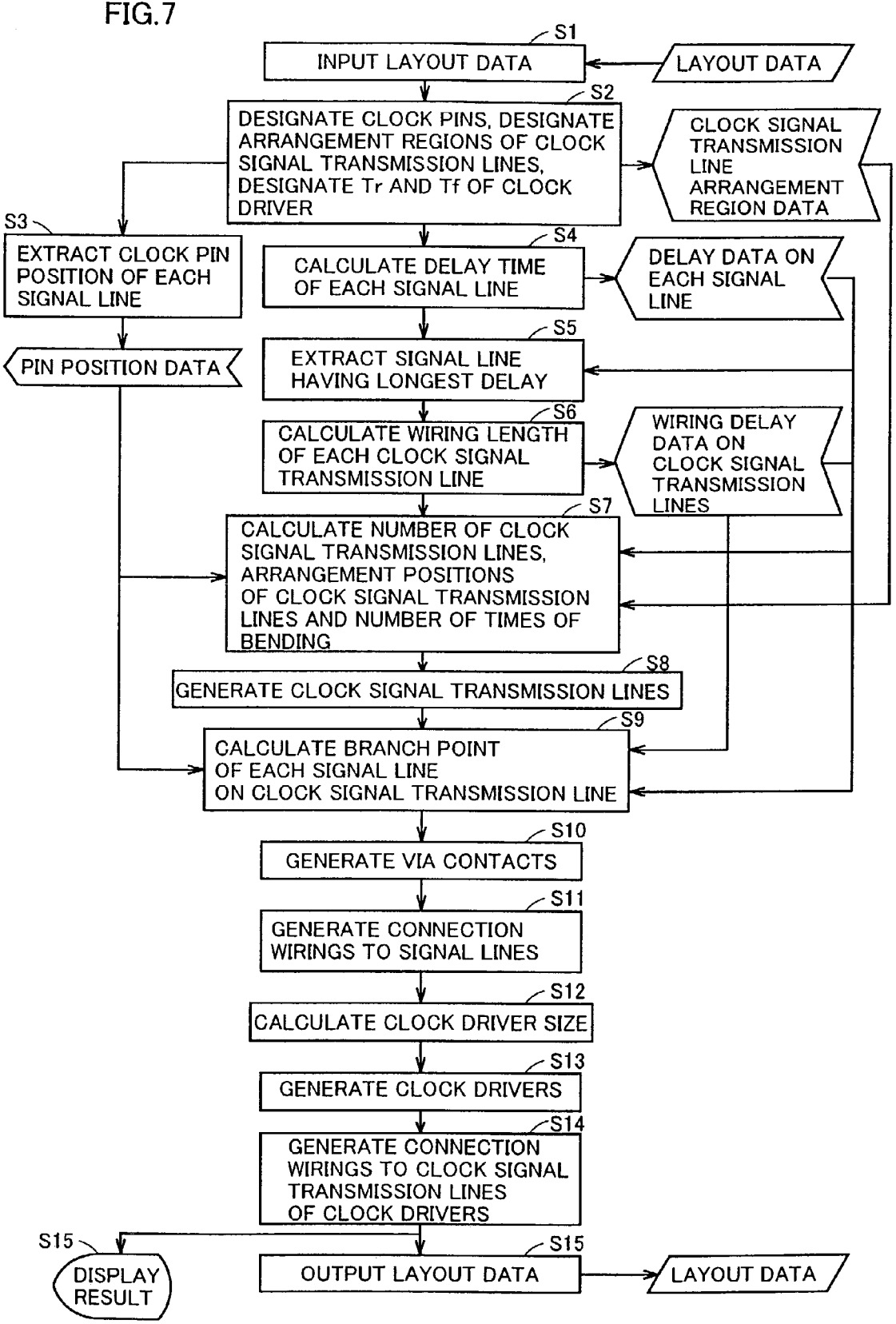
FIG. 7 is a flow chart showing a wiring layout design method for a clock signal transmission line in an eighth embodiment according to the present invention.

FIG. 7 is a flow chart showing a wiring layout design method for a clock signal transmission line in an eighth embodiment according to the present invention.

Referring to FIG. 7, this wiring layout design method is realized by allowing a computer (wiring layout design apparatus) to execute a program. The wiring layout design apparatus may be integrated with a conventional, well-known auto placement and routing apparatus or may be integrated with a full custom layout editor.

Figure 8:
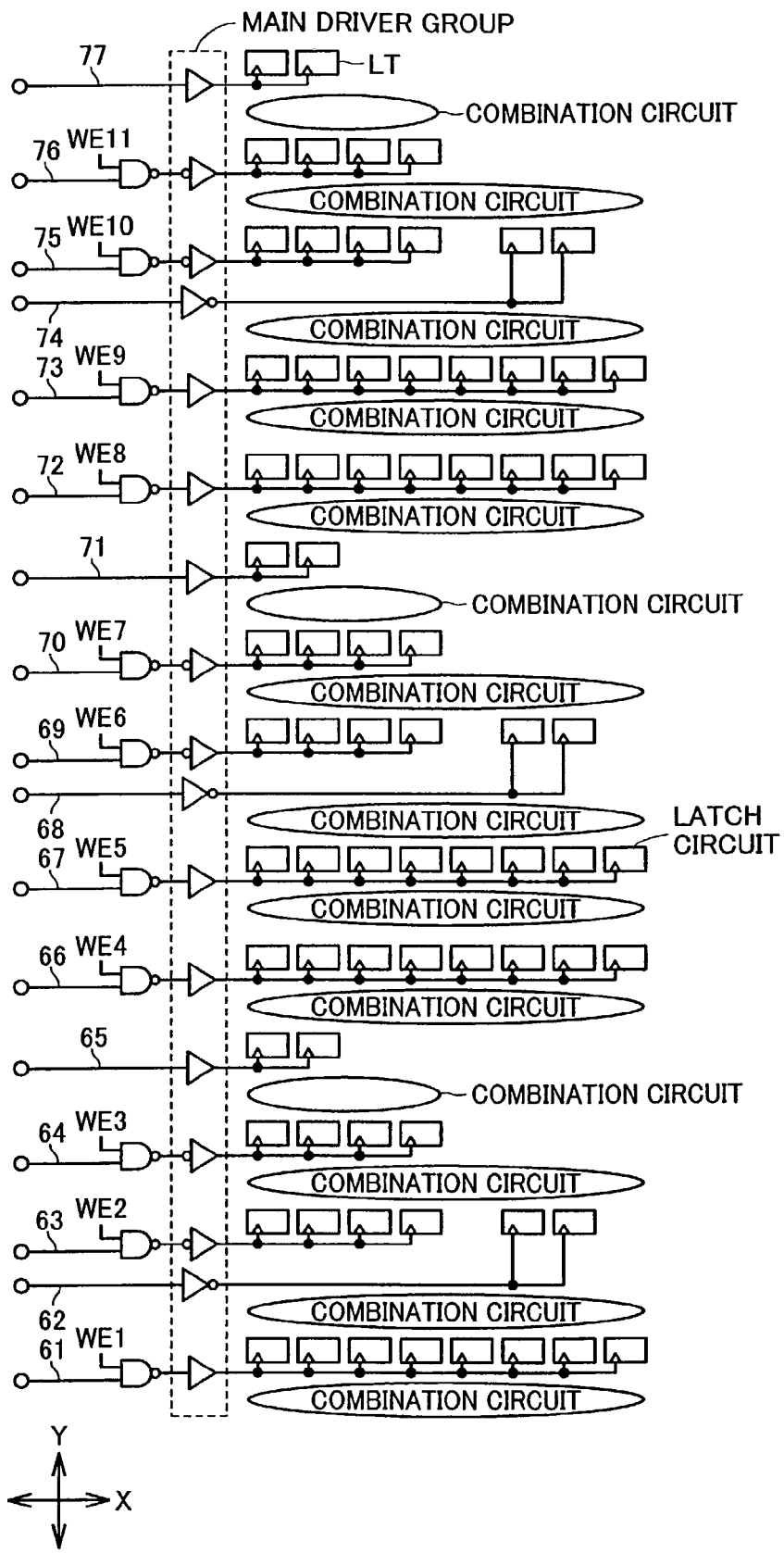
FIG. 8 is a block diagram showing one example of layout data.

FIG. 8 shows one example of layout data.

Referring to FIG. 8, the layout data schematically shows a state in which a plurality of (seventeen) signal lines 61 to 77, a plurality of latch circuits connected to each of these signal lines, a plurality of combination circuits, seventeen main drivers inserted into signal lines 61 to 77, respectively, and eleven NAND logical gates inserted into the eleven signal lines out of the seventeen signal lines are laid out.

The wiring layout design method will be described with reference to FIG. 7.

(Step S1): Input layout data.

Layout data is inputted into the wiring layout design apparatus. The layout data may be generated by a layout editor or the like.

Referring to the layout shown in FIG. 8, eight latch circuits LT's are connected to each of signal lines 61, 66, 67, 72 and 73, four latch circuits LT's are connected to each of signal lines 63, 64, 69, 70, 75 and 76 and two latch circuits LT's are connected to each of remaining signal lines 62, 65, 68, 71, 74 and 77.

A clock signal transmission line for transmitting a clock signal CLK on a clock trunk to these signal lines is designed. The clock signal transmission line is designed to include a plurality of straight portions arranged in a direction Y and a plurality of bent portions as in the case of the first to sixth embodiments. A method for designing the clock signal transmission line will be described later.

By inputting the layout data, arrangement position information indicating the arrangement positions of the respective signal lines and storage circuit number information on the number of latch circuits LT's connected to each signal line are inputted.

(Step S2): Set various information.

The positions of the end points of the respective signal lines at which clock signal CLK is received in the layout are specified. In FIG. 8, the end points of the respective signal lines are arranged adjacently in direction Y. After specifying the respective end points, the specified end points are named arbitrary clock pin names, respectively.

After specifying the positions of the end points of the respective signal lines, the arrangement region of clock signal transmission lines is determined. In FIG. 8, seventeen signal lines are arranged adjacently. Therefore, the arrangement region of the clock signal transmission lines is set to be adjacent the respective end points of the seventeen signal lines. Alternatively, the arrangement region of the clock signal transmission lines can be automatically set from position information on the end points of the respective signal lines.

Figure 9:
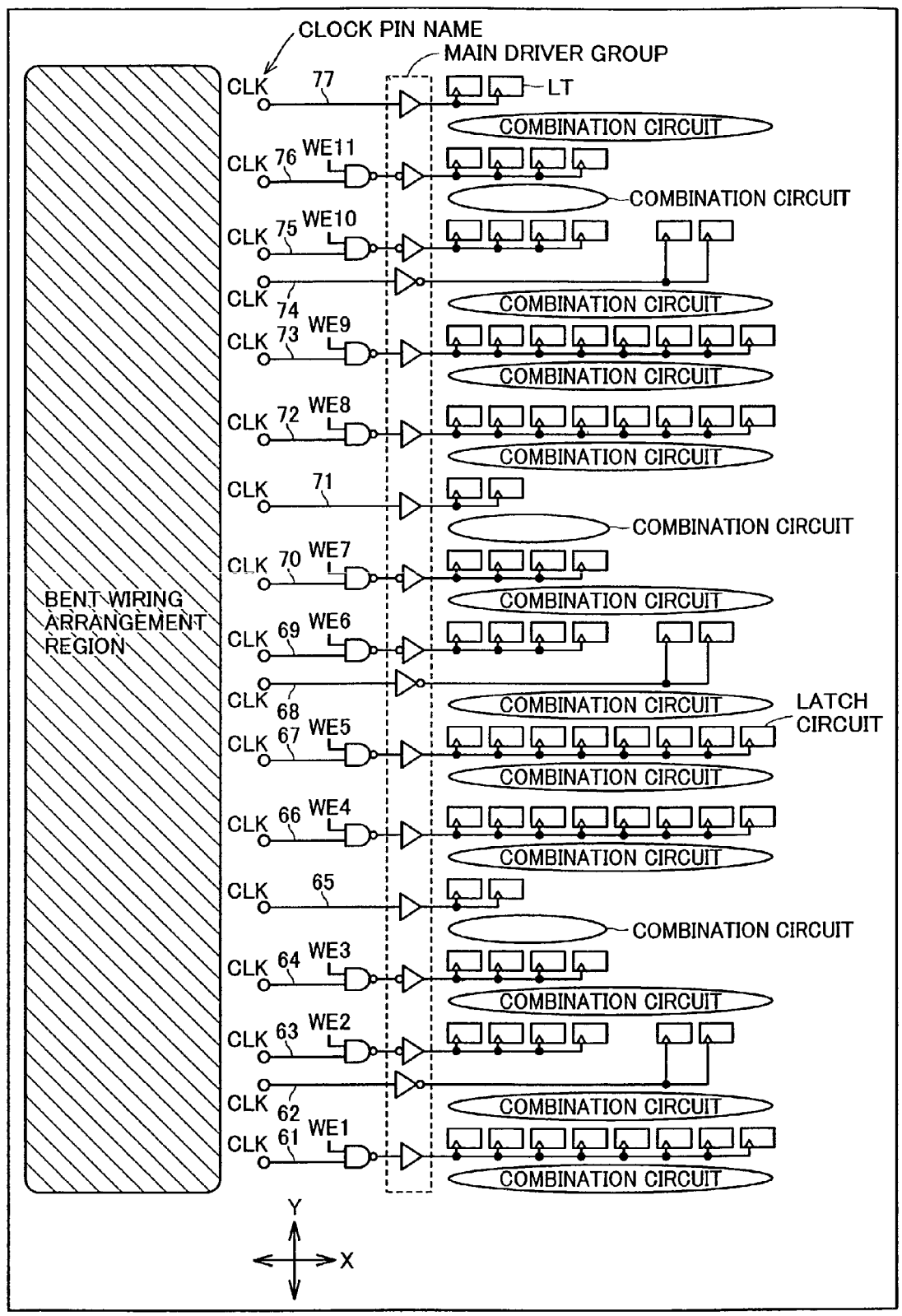
FIG. 9 is a block diagram of a semiconductor integrated circuit device generated by a step S2 shown in FIG. 7.

Further, rise time Tr and fall time Tf of each of clock drivers for driving the respective clock signal transmission lines are designated. Rise time Tr is time at which the clock driver changes a signal transmitted on the clock signal transmission line from an L level to an H level and fall time Tf is time at which the clock driver changes the signal transmitted on the clock signal transmission line from the H level to the L level. FIG. 9 shows a program execution result obtained so far.

The designation of the respective information in step S2 is conducted by the input of data into the wiring layout design apparatus by an integrated circuit designer.

(Step S3): Extract clock pin positions.

The positions of the end points of the respective signal lines are extracted from the clock pin names set in step S2 on, for example, a two-dimensional coordinate.

(Step S4): Calculate delay time of each signal line.

Delay time Tn for which clock signal CLK is propagate from the end point allocated the clock pin name of each of signal lines 61 to 77 to latch circuit LT located at the nearest position to the main driver of the signal line and delay time Tx for which clock signal is propagated from the clock pin of each signal line to latch circuit located at the farthest from the main driver thereof are calculated.

(Step 5): Extract signal line having longest delay.

Delay time Tx of respective signal lines 61 to 77 is compared with one another and the longest delay time and the signal line having the longest delay time are extracted.

(Step S6): Calculate wiring length of each clock signal transmission line.

The wiring length of each clock signal transmission line is calculated from delay time Tx of the signal line having the longest delay as extracted in step S5. The wiring length is such that time required for clock signal CLK to be propagated from one end to the other end of the clock signal transmission line becomes equal to or longer than delay time Tx of the signal line having the longest delay. In addition, time required for clock signal CLK to be propagated through a certain interval if the clock signal transmission line is separated at certain intervals (which time corresponds to Ta/n and will be referred to as "wiring delay data" hereinafter, where Ta indicates delay time for which clock signal is propagated from one end to the other end of the clock signal transmission line and n indicates the number of separations) is calculated.

(Step S7): Calculate wiring positions of each clock signal transmission line and number of bent portions.

Taking the arrangement status of the signal lines having long delay time into consideration, the number of clock signal transmission lines, the arrangement positions of the clock signal transmission lines and the number of bent portions in the clock signal transmission lines.

The number of clock signal transmission lines is determined based on the arrangement position information extracted from the inputted layout data and the calculated delay time. At this moment, the number of clock signal transmission lines is determined by determining where the signal lines having long delay time are distributed. According to the determined number, one or a plurality of clock signal transmission lines are designed. It is determined whether or not delay time Tx of each signal line calculated in step S4 is not less than a certain value and signal lines having delay time not less than the certain value are extracted. A plurality of signal lines are divided into several groups so that each group includes the two extracted signal lines, and one clock signal transmission line is provided per group.

In FIG. 9, it is determined from signal line 61 until which signal line are set as one group by counting signal lines 61 to 77 in this order. Among the signal lines each having delay time Tx which is not less than the certain value, signal line 66 is assumed as the signal line nearest to signal line 61. Signal lines 61 and 66 are two signal lines to be included in one group and one clock signal transmission line is applied for signal lines 61 to 66.

Next, it is determined from signal line 67 until which signal line are set as one group while counting signal lines 67 to 77 in this order. It is assumed that signal lines 67 and 72 have delay time which is not less than the certain value and that signal line 72 is located at the nearest position from signal line 67. Signal lines 67 and 72 are included in one group. One clock signal transmission line is applied for signal lines 67 to 71.

Next, it is determined from signal line 73 until which signal line are set as one group while counting signal lines 73 to 77 in this order. It is assumed that only signal line 73 has delay time Tx which is not less than the certain value among signal lines 73 to 77. As for the remaining signal lines which are not divided into groups as shown, if the number of signal lines having delay time Tx which is not less than the certain value is not more than one, all the remaining signal lines are set as one group. As a result, one clock signal transmission line is applied for signal lines 73 to 77.

Consequently, three clock signal transmission lines are provided in the example of FIG. 9. If delay time Tx of any one of the three clock signal transmission lines is not more than the certain value, only one clock signal transmission line may be provided.

Based on the position information on the end portions of the respective signal lines and the arrangement region information on the clock signal transmission lines, the arrangement positions of the respective clock signal transmission lines and the number of bent portions of each clock signal transmission line are determined. The wiring length of each clock signal transmission line is set according to the wiring length calculated in step S6.

(Step S8): Generate clock signal transmission lines.

Figure 10:
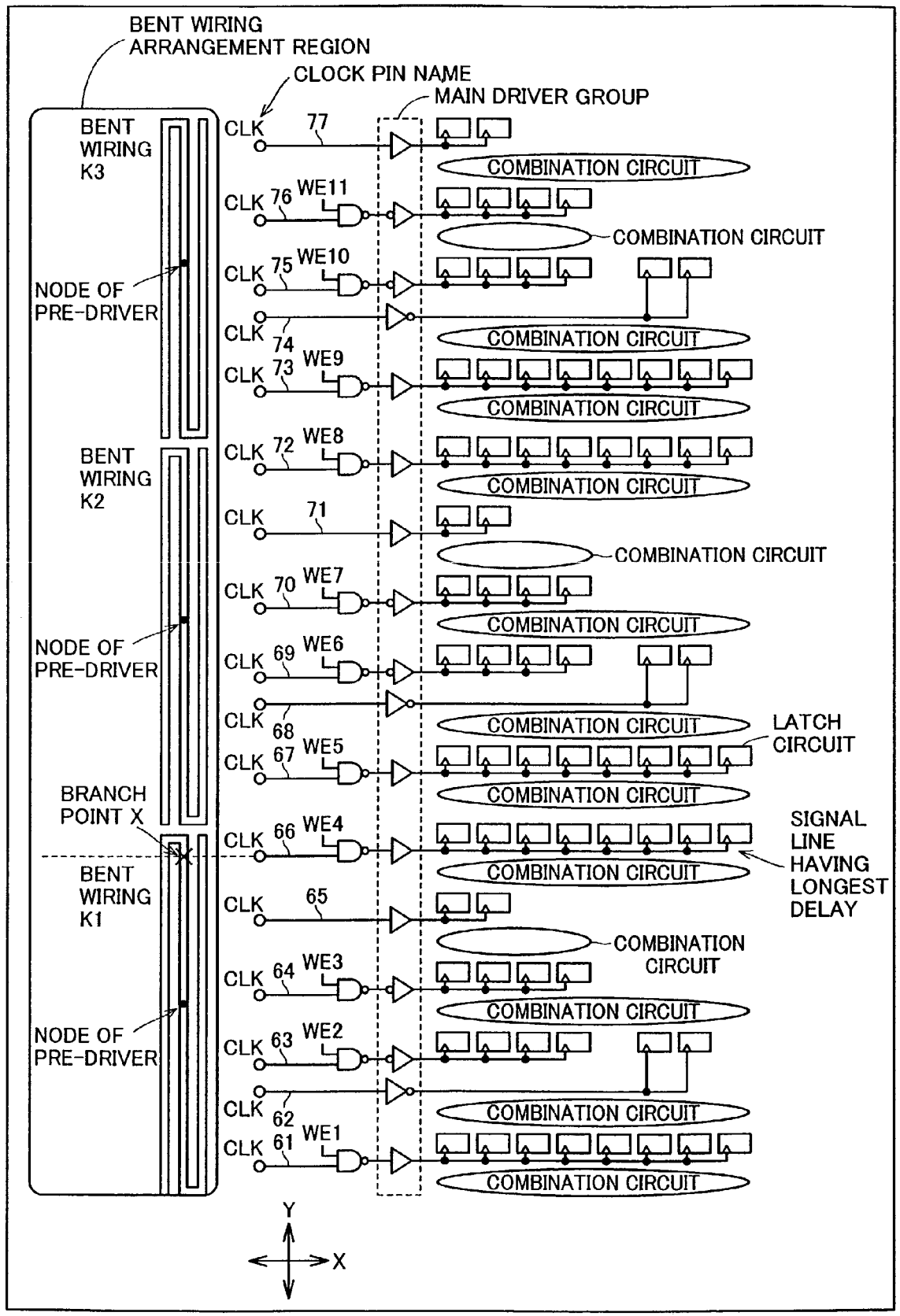
FIG. 10 is a block diagram of a semiconductor integrated circuit device generated by a step S7 shown in FIG. 7.

Clock signal transmission lines are generated at the arrangement positions determined in step S7 based on the calculated wiring lengths and the calculated number of bent portions. FIG. 10 shows a program execution result obtained so far. Each of three clock signal transmission lines K1 to K3 has three straight portions arranged on two bent portions. Signal lines 61 to 66 are connected to corresponding clock signal transmission line K1. Signal lines 67 to 72 are connected to corresponding clock signal transmission line K2. Signal lines 73 to 77 are connected to corresponding clock signal transmission line K3.

(Step S9): Calculate nodes between clock signal transmission lines and signal lines.

Using the delay time of each signal line and the pin position data obtained in step S3, the nodes between the signal lines and the corresponding clock signal transmission lines are calculated.

In this embodiment, it is assumed that the output terminal of the clock driver is connected to the intermediate point of a length from one end to the other end of each clock signal transmission line.

The nodes are calculated in accordance with the following (1) to (3).

(1) Based on the coordinate of the position of the intermediate point of each clock signal transmission line and the coordinate of the position of the end point (to be referred to as "clock pin" hereinafter) of the signal line having the longest delay as extracted in step S5, the coordinate position at which the distance between the both positions becomes the shortest is calculated and the node between the signal line having the longest delay and the corresponding clock signal transmission line is determined.

Referring to FIG. 10, it is assumed, for example, signal line 66 is the signal line having the longest delay. The intersection having the shortest distance between the clock pin of signal line 66 and the intermediate point of the corresponding clock signal transmission line is selected as a node from among three intersections between a straight line extended from the clock pin of signal line 66 along direction X and the three straight portions of the clock signal transmission line provided for the group to which signal line 66 belongs. A point X on the clock signal transmission line shown in FIG. 10 becomes the node between signal line 66 and the clock signal transmission line.

(2) Delay time T0 of the clock signal delayed at the intermediate position of each clock signal transmission line and arriving at the clock pin of the signal line having the longest delay through the node between the clock signal transmission line and the signal line having the longest delay is added to each of delay time Tn and Tx of the signal line having the longest delay as calculated in step S4. Time A ((Tn of signal line having longest delay)+T0) required for clock signal to arrive from the intermediate point of the clock signal transmission line at the latch circuit located at the nearest position to the branch point of the signal line having the longest delay and time B=((Tx of signal line having longest delay)+T0) required for clock signal to arrive from the intermediate point of the clock signal transmission line at the latch circuit located at the farthest position from the branch point of the signal line having the longest delay are calculated.

(3) The node between each signal line and the corresponding clock signal transmission line is determined based on the position data on the clock pin of each of the signal lines excluding the signal line having the longest delay, delay time Tn and Tx of each of signal lines excluding the signal line having the longest delay as calculated in step S4, time A and B stated above and the data calculated in step S6.

The branch point of each signal line is selected from the three intersections between a straight line extended in direction X through each clock pin and three straight portions of the corresponding clock signal transmission line.

To be specific, the node of any signal line is selected so that delay time (shortest delay time) required for clock signal CLK to arrive from the intermediate point of the corresponding clock signal transmission line at the latch circuit located to the nearest position to the node through the signal line becomes equal to or longer than time A and so that delay time (longest delay time) required for clock signal to arrive from the intermediate point of the corresponding clock signal transmission line at the latch circuit located at the farthest position to the branch point through the signal line becomes equal to or shorter than time B.

(Step S10): Generate via contacts.

Via contacts are generated at the nodes determined in step S9.

(Step S11): Generate connection wirings to signal lines.

Figure 11:
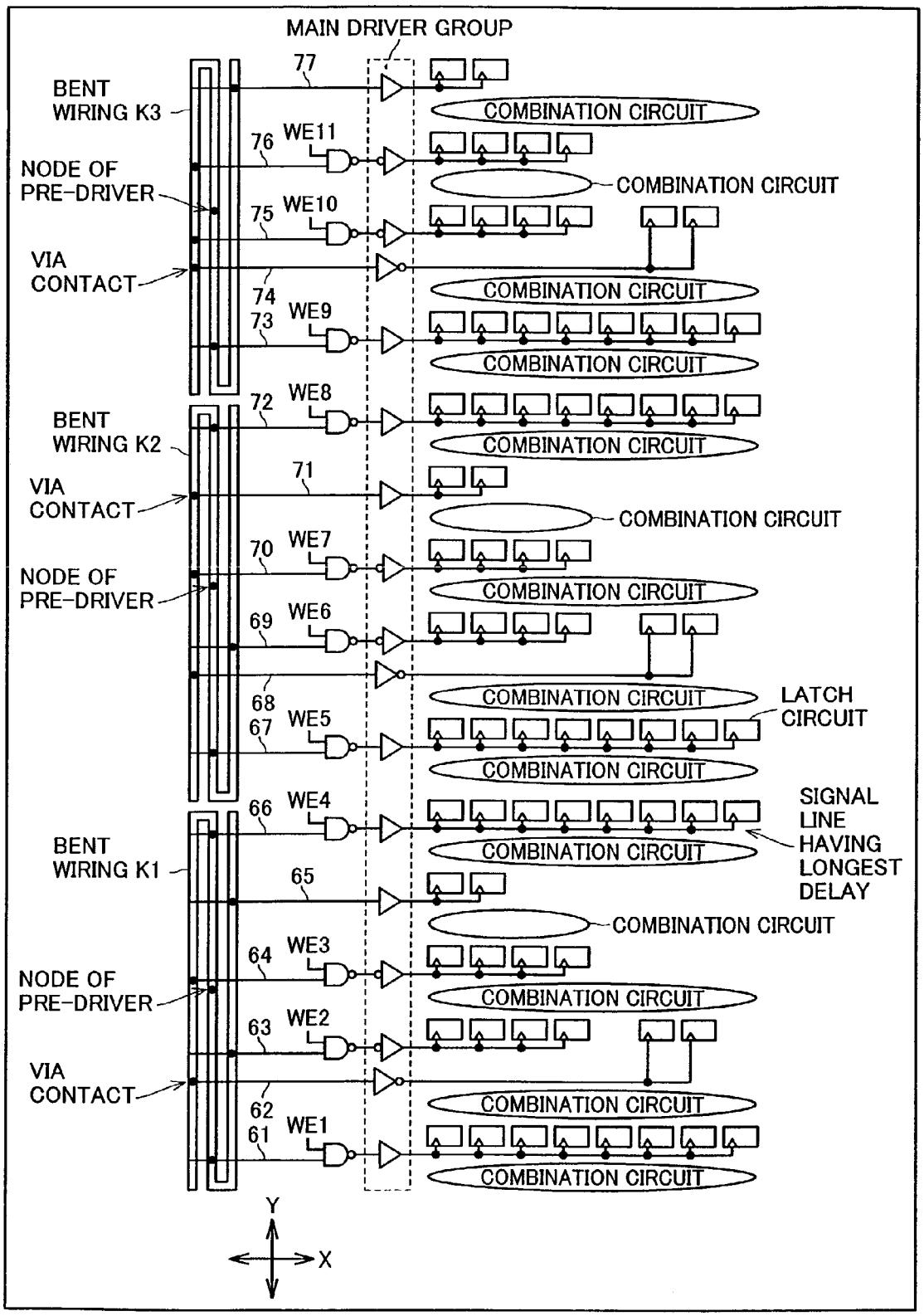
FIG. 11 is a block diagram of a semiconductor integrated circuit device generated by a step S11 shown in FIG. 7.

Wirings along direction X connecting the via contacts to the clock pins are generated and each signal line is connected to the corresponding clock signal transmission line through each via contact. FIG. 11 shows a program execution result obtained so far.

(Step S12): Calculate clock driver size.

Based on the shortest delay time, the longest delay time, delay time A and delay time B of each signal line calculated in step S9 and rise time Tr and fall time Tf designated in step S2, the size of each clock driver is calculated.

(Step S13): Generate clock drivers.

Based on coordinate information on the node of the clock driver on each clock signal transmission line (intermediate point of each clock signal transmission line), three clock drivers having the driver sizes calculated in step S12 are generated to correspond to the three clock signal transmission lines, respectively.

(Step S14): Connect clock signal transmission lines to respective clock drivers.

Figure 12:
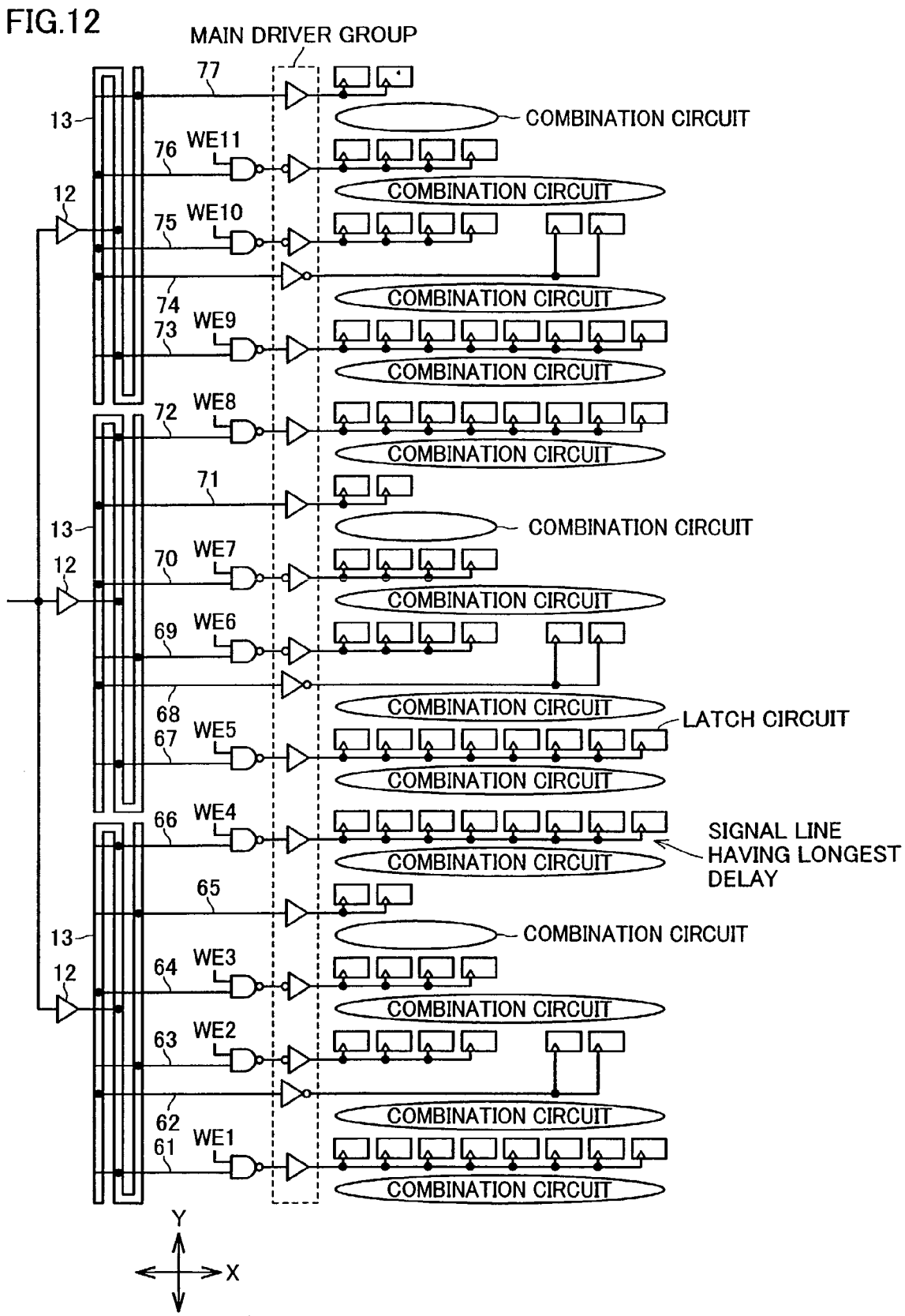
FIG. 12 is a block diagram of a semiconductor integrated circuit device generated by a step S14 shown in FIG. 7.
Figure 13:
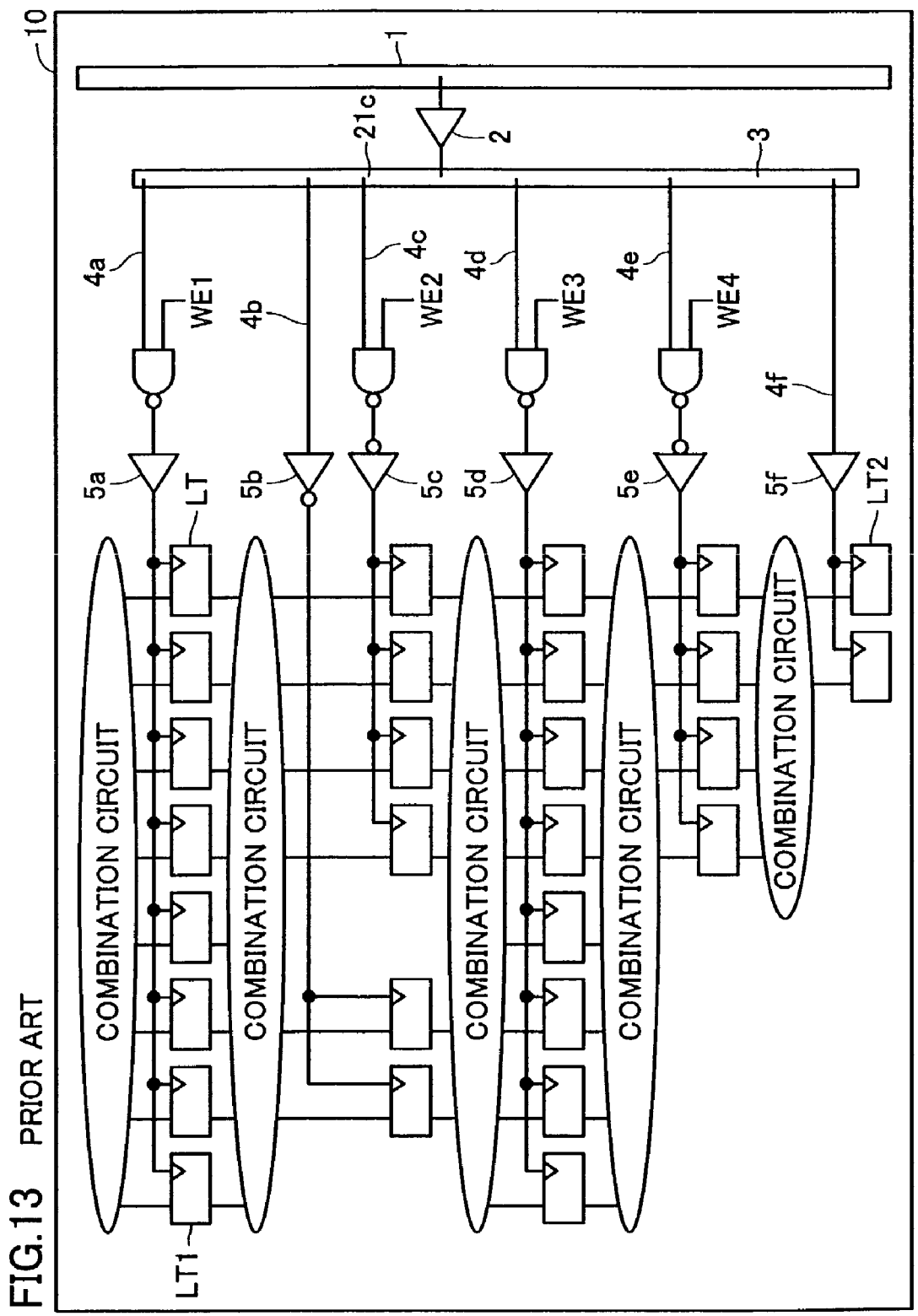
FIG. 13 is a block diagram showing the schematic configuration of a conventional semiconductor integrated circuit device.

A via contact is generated at the node between each clock signal transmission line and the corresponding clock driver. In addition, the connection wiring between each clock driver and each via contact is generated and the clock drivers are connected to the corresponding clock signal transmission lines, respectively. FIG. 12 shows a program execution result obtained so far.

(Step S15): Output layout data.

Layout data indicating the layout configuration in which the clock signal transmission lines distributing the clock signal are connected to the signal lines is outputted. In addition, the execution result is displayed on the display provided at the apparatus.

As stated above, if clock signal transmission lines are generated, the nodes of the respective signal lines to the corresponding clock signal transmission lines are determined using the fact that clock signal arrival time differs among a plurality of straight portions of the respective clock signal transmission lines and considering the delay time of each signal line. It is, therefore, possible to reduce a clock skew.

Using the wiring layout design method in this embodiment, the same clock signal transmission line as that in the second embodiment can be automatically generated. It is also possible to apply this wiring layout design method to the wiring layout design apparatuses which function to generate the clock signal transmission lines in the first embodiment and the third to sixth embodiments. Furthermore, the clock signal transmission line wiring layout design method in this embodiment may be realized completely automatically by a program or realized semi-automatically by a designer's operation interactively with the apparatus while referring to layout drawings on the display.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor integrated circuit device comprising:
  a clock signal transmission line including a plurality of straight portions arranged side by side with their longitudinal directions approximately in parallel with each other and forming a path from a point on the line via said plurality of straight portions one after another along their longitudinal directions to reach another point on the line;
  a plurality of storage circuits operating in synchronization with a clock signal; and
  a plurality of signal lines each connected to said clock signal transmission line to supply said clock signal to at least one of said plurality of storage circuits;
  said clock signal transmission line including at least one portion located between two of said plurality of straight portions through which the clock signal having been transmitted on one of said plurality of straight portions in one direction along the longitudinal direction is guided such that the same clock signal is transmitted on succeeding one of said straight portions in the opposite direction along the longitudinal direction, and
  said plurality of signal lines including a first signal line connected to a first straight portion among said plurality of straight portions and a second signal line connected to a second straight portion, that is different from said first straight portion, among said plurality of straight portions.

2. The semiconductor integrated circuit device according to claim 1 having circuits integrated on a main surface of a semiconductor substrate, wherein
  said second signal line and said first straight portion cross with each other with a space therebetween in a direction perpendicular to the main surface of said semiconductor substrate.

3. The semiconductor integrated circuit device according to claim 1, wherein
wherein
  said clock signal transmission line has a first end and a second end between which said path extends, and
  said clock signal is supplied to an intermediate portion between said first and second ends of said clock signal transmission line.

4. The semiconductor integrated circuit device according to claim 1, further including a delay circuit provided corresponding to two of said plurality of straight portions, with its input connected to one of the two straight portions and its output connected to the other of the two straight portions.

5. The semiconductor integrated circuit device according to claim 1, wherein said clock signal transmission line is formed of a material exhibiting higher resistance than a material forming said plurality of signal lines.

6. The semiconductor integrated circuit device according to claim 1 having circuits integrated on a main surface of a semiconductor substrate, wherein
  each of said plurality of signal lines crosses any of said plurality of straight portions of said clock signal transmission line with a space therebetween in a direction perpendicular to the main surface of said semiconductor substrate, and is connected to any one of said plurality of straight portions via a contact extending in the direction perpendicular to said main surface of said semiconductor substrate.

7. A semiconductor integrated circuit device comprising:
  a first clock signal transmission line including a plurality of first straight portions arranged side by side with their longitudinal directions approximately in parallel with each other and forming a first path from a point on the line via said plurality of first straight portions one after another along their longitudinal directions to reach another point on the line;
  a second clock signal transmission line including a plurality of second straight portions arranged side by side with their longitudinal directions approximately in parallel with each other and forming a second path from a point on the line via said plurality of second straight portions one after another along their longitudinal directions to reach another point on the line;
  a delay circuit having its input connected to said first clock signal transmission line and its output connected to said second clock signal transmission line for delaying an incoming signal for output;
  a plurality of storage circuits operating in synchronization with a clock signal; and
  a plurality of signal lines each connected to either one of said first and second clock signal transmission lines and supplying said clock signal to at least one of said plurality of storage circuits;
  said first clock signal transmission line including at least one portion located between two of said plurality of first straight portions through which said clock signal having been transmitted on one of said first straight portions in one direction of the longitudinal direction is guided such that the same clock signal is transmitted on succeeding one of said first straight portions in the opposite direction of the longitudinal direction,
  said second clock signal transmission line including at least one portion located between two of said plurality of second straight portions through which said clock signal having been transmitted on one of said second straight portions in one direction of the longitudinal direction is guided such that the same clock signal is transmitted on succeeding one of said second straight portions in the opposite direction of the longitudinal direction,
  said plurality of first straight portions and said plurality of second straight portions being arranged with their longitudinal directions approximately in parallel with each other, and each of said plurality of signal lines being connected to one of said plurality of first and second straight portions.

8. The semiconductor integrated circuit device according to claim 7 having circuits integrated on a main surface of a semiconductor substrate, wherein
each of said plurality of signal lines crosses any of said plurality of first and second straight portions of said first and second clock signal transmission lines with a space therebetween in a direction perpendicular to said main surface of said semiconductor substrate, and is connected to any one of said plurality of first and second straight portions via a contact extending in the direction perpendicular to said main surface of the semiconductor substrate.

9. A wiring method for arranging one or more clock signal transmission lines connected to a plurality of signal lines each connected to at least one storage circuit for supplying a clock signal to said plurality of signal lines, the method comprising:
a first step of calculating, for each of said plurality of signal lines, a delay time in which said clock signal is transmitted from a point on the relevant signal line to the storage circuit located at a farthest position from said point;
a second step of arranging, as said one or more clock signal transmission lines, one or more bent wiring each including a plurality of straight portions arranged side by side with their longitudinal directions approximately in parallel with each other and forming a path from a point on the wiring via said plurality of straight portions one after another along their longitudinal directions to reach another point on the wiring; and
a third step of calculating, based on the respective delay times of said plurality of signal lines, connect points where said plurality of signal lines are connected to said one or more clock signal transmission lines.

10. The wiring method according to claim 9, wherein said second step includes the step of extracting a longest delay time from among the calculated delay times of said plurality of signal lines, and calculating a wiring length from an end to another end of said clock signal transmission line.

11. The wiring method according to claim 9, wherein said second step includes the step of obtaining, based on the delay times calculated in said first step, a number of said clock signal transmission lines to be generated.

12. The wiring method according to claim 9, wherein said third step includes the step of selecting the connect points where respective said signal lines are connected to corresponding said clock signal transmission lines, from among crossing points of straight lines extending from respective points of said plurality of signal lines along a direction in which said plurality of straight portions of said one or more clock signal transmission lines are arranged side by side and the plurality of straight portions.

* * * * *